Jan. 17, 1939.  J. H. VAN UUM  2,144,171

SELF-LOCKING RETAINING CLIP

Filed Aug. 5, 1936

INVENTOR.
JOHN H. VAN UUM
BY
*John Harrow Leonard,*
his ATTORNEY.

Patented Jan. 17, 1939

2,144,171

UNITED STATES PATENT OFFICE 2,144,171

SELF-LOCKING RETAINING CLIP

John H. Van Uum, Lakewood, Ohio

Application August 5, 1936, Serial No. 94,428

7 Claims. (Cl. 24—213)

This invention relates to spring clip retaining devices for securing a plurality of elements together in firm juxtaposition, and more particularly to a device of this character for connecting elements to flat perforated smooth wall surfaces through the medium of the perforations by new cooperative relations between the parts of the device, the perforations, and the marginal portions of the wall adjacent the perforations.

Since such spring clip devices have heretofore been used extensively in securing weather strips or resilient bumper strips to automobile bodies and the like, and the problems presented in this connection are therefore well known, the present invention will be disclosed for purposes of illustration in a form adapted for such use, the use of the device for connecting other elements being apparent therefrom.

Heretofore the spring clip retaining devices so used were of such design and construction that inadvertent detachment of the devices often occurred under normal conditions of use, due to inherent defects in the devices themselves. For example, it was heretofore considered necessary to compromise between resilient expanding legs of sufficient rigidity to hold the clip securely in connected relation in the aperture of the wall to which applied and of sufficient resiliency to compress readily and permit easy insertion of the legs into the aperture of the wall. In trying to satisfy such diametrically opposed conditions of use, compromises made were such that the prior clips were not satisfactory from either standpoint.

The principal object of the present invention, therefore, is to provide a clip of this general character so constructed and arranged that the legs are of sufficient resiliency to enter the aperture of the wall readily and easily and yet are of sufficient rigidity and gripping power, due to their novel cooperation with other parts of the clip and wall, as to remain securely in place after insertion in the aperture.

Another object is to provide a clip of this character which is self-centering with respect to the aperture, and one which retains its centralized position therein and is equally resistant to detachment by forces directed axially of the aperture or in a direction tending to rock the device on the support.

Another object is to provide a clip formed of a single piece of resilient metal which is self-locking with respect to the support so that it cannot be moved in any direction and in which the spring action is so effective that the device does not become dislodged, loosened, or separated from the support.

Another object is to provide a device having these advantages and yet so arranged that a weather strip or element to be held to the support thereby may be readily connected thereto either before or after the installation of the device in the aperture of the associated wall.

Other objects will become apparent in the following specification wherein reference is made to the accompanying drawing, in which.

Figure 1:
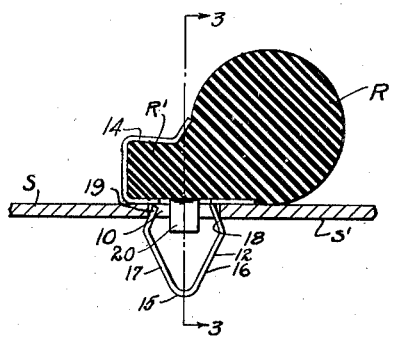
Fig. 1 is a sectional view through a resilient strip and support, showing, in elevation, a spring clip retaining device of the present invention connecting the strip to the support.

Resilient strips, such as weather stripping and rubber stripping, are now widely used in automobile construction to embrace the windows and ventilating devices, doors, hoods, etc., to eliminate vibration and rattle of the parts. Economy in vehicle manufacturing requires that such strips be rapidly attached and be very firmly and permanently held in place.

For purposes of illustration, a common form of resilient stripping is disclosed in the drawing and comprises a resilient rubber weather strip R having a projecting attachment portion R' for attachment to spring clip devices.

The spring clip devices cooperate with a series of apertures 10 in a supporting member S, which forms a part of the automobile body, hood, or the like, and to which the particular strip is to be secured in firm juxtaposition.

The retaining spring clip formed of a single strip of spring metal, or the like, is illustrated in Fig. 1 and comprises a substantially V-shaped nose portion in the form of a loop, generally indicated at 12, and a base portion 13 integral therewith and provided with a suitable element retaining means.

In the form illustrated in which the clip is to be attached to the attaching portion R' of the strip R, this element retaining means may comprise the resilient integral clamp portion 14. The nose 12 projects normal to the plane of the base portion 13 at one face thereof and is generally in loop form with the horizontal axis of the loop extending generally parallel to the lengthwise dimension of the resilient strip R and to the width of the base portion 13, for reasons later to be disclosed herein.

To provide this relation in a device formed from a single flat strip of metal, one margin of the strip is bent at right angles to the plane of the strip and bent again at its free margin to define the clamp portion 14. The main body of the metal of the base portion 13 is cut away to form at the margin opposite the portion 14 an elongated relatively narrow tongue portion which extends at right angles to the portion 14 and the width of which is located centrally of the width of the base portion 13, the main body being slit parallel to the tongue portion from the edge inwardly so that the tongue portion, in effect, continues partway toward the midportion of the body. This tongue portion is then bent between its ends to provide a rounded nose 15 from which extend divergent leg portions 16 and 17, these portions being bent inwardly abruptly to provide sloping locking shoulders 18 and 19, respectively, which are arranged for gripping engagement with the inner surface S' of the supporting member S when the divergent leg portions 16 and 17 are compressed and passed through the associated aperture 10, and returned toward their normal unflexed position.

The sloping locking shoulder 18 is integral with the base portion 13 of the spring clip device while the sloping locking shoulder 19 is formed on the free end of the leg portion 15. However, the free end of the sloping locking shoulder 19 contacts the base member 13 upon slight compression of the V-shaped nose portion 12, as illustrated in Fig. 1, and is thereby buttressed so as to provide, in cooperation with the base 13, a closed loop spring clip. Due to the closed loop operation a much more pronounced spring action utilizing the full spring effect of the entire portion of the metal forming the resilient legs and shoulders is provided for urging the legs 16 and 17 relatively apart, thus effecting firm engagement with the supporting member S. Due to the free end of the shoulder 19 tightly engaging the under face of the base 13 with increasing frictional contact as the legs are stressed toward each other, the resistance to this movement of the legs together becomes more pronounced and renders the resulting loop much more rigid after insertion than during insertion. Since, after installation a substantially closed loop is provided, the entire loop is effective in providing spring pressure and localized concentrated stresses at the bends are eliminated. If the loop were thus closed before installation, it would be practically impossible to insert the loop through the aperture. The locking shoulders 18 and 19 are turned inwardly abruptly to provide for securely gripping beneath the support, and the slope of the shoulders compensate for varying thicknesses of the material which comprise the supporting member and tend to cam the resilient strip R toward the support with yielding pressure when the spring clip device is installed.

In addition to slitting the base 13 at the juncture with the tongue portion forming the leg portions 16 and 17 and the shoulders 18 and 19, the lengthwise edges of the base 13 is also provided with slits or notches extending parallel to the axis of the loop so as to provide metal tongues which are bent substantially normal to the base 13 but slightly inwardly toward the loop 12 to provide locking and centering lugs 20 and 21. Upon bending the metal to form the lugs 20 and 21 and the loop 12, buttress portions 24 and 25 are defined on the base 13. A corresponding buttress portion is formed by the opposite margin of the base. These buttress portions extend beyond the limits of the loop 12 in all directions in the plane of the base 13.

Figure 2:
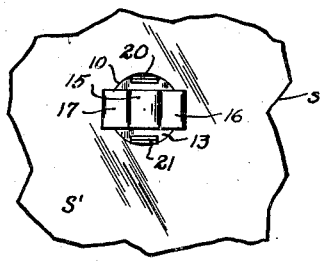
Fig. 2 is a bottom plan view of the device and support illustrated in Fig. 1.
Figure 3:
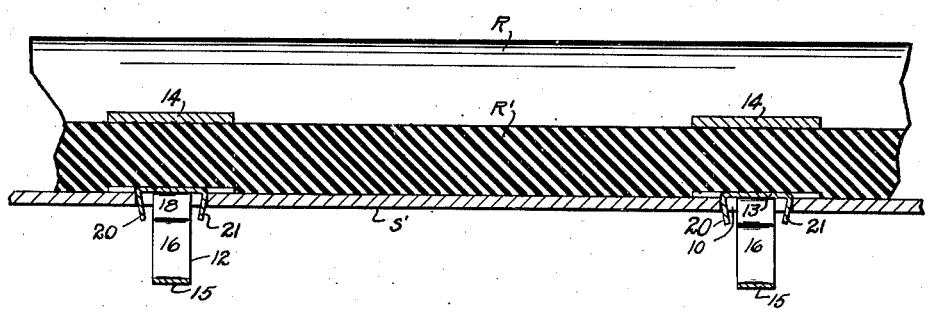
Fig. 3 is a longitudinal sectional view taken on a plane indicated by the line 3—3 of Fig. 1.

It will be seen in Figs. 1, 2, and 3, that when the clip is installed, the loop portion 12 projects through and engages the aperture 10 in the supporting member and the buttress portions 24 and 25 contact the outer surface of the support in face to face relation. The locking and centering lugs 20 and 21 engage the aperture 10 substantially at right angles to the loop portion 12 and prevent movement of the device radially of the aperture. The lugs 20 and 21 are of such width and so positioned relative to the shoulders 18 and 19 that, when the loop 12 is installed in the aperture 10, the lugs 20 and 21 resiliently abut the circumference of the aperture symmetrically with respect to the diameter and at portions of the circumference offset 90° from the portions of the circumference abutted by the shoulders 18 and 19. The lugs 20 and 21 do not fit the contour of the aperture but are chordally disposed with respect thereto so that the raw edges of the lugs are tightly in contact with the aperture wall and tend to cut or "dig" into the aperture wall the instant that the clip is subjected to any force which would otherwise cause it to rotate in or tilt in the aperture, and thus lock the clip in place.

This locking effect is augmented by the buttress portions 24 and 25. For example, due to the buttress portions, any rocking action of the clip relative to the plane of the support must result in bodily rotation of the clip about the outermost edges of the buttress portions. These edges being spaced a considerable distance from the axis of the aperture, the resultant path of swinging of the shoulders 18 and 19 is more nearly axially of the aperture. But the gripping effect of the shoulders 18 and 19 is most pronounced in this direction and the stress tending to move the clip axially of the aperture is divided nearly equally between the shoulders 18 and 19 and not concentrated on the weaker shoulder 19 at the free end of the loop. As a result, tilting of the clip is prevented by the lugs 20 and 21 and movement of the clip axially of the aperture is prevented by the shoulders 18 and 19. Tilting of the clip transversely of the shoulders is resisted directly by the lugs 20 and 21 and the width of the shoulders 18 and 19.

As mentioned, at one extremity of the strip of spring metal opposite to the extremity from which the loop portion 12 is formed, the strip of metal is bent upwardly and then abruptly and slightly downwardly to provide the clamp portion 14 which yieldably and tightly grips the projecting attachment portion R' of the resilient strip R.

In securing the weather stripping or resilient stripping R, in the present case, the spring clip retaining devices are first inserted in the openings 10 of the supporting member S and are held in proper position therein. The weather strip or resilient strip is then secured in the clamp portions 14 by means of the projecting attachment portion R' of the resilient strip.

Figure 4:
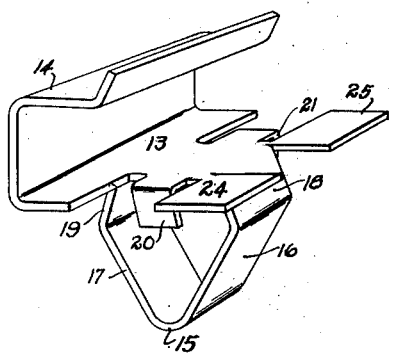
Fig. 4 is an enlarged perspective view of the spring clip retaining device illustrated in Fig. 1.
Figure 5:
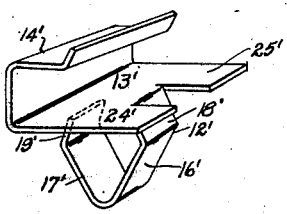
Fig. 5 is a perspective view of a modified form of the spring clip retaining device.

The modified form of my spring clip retaining device, illustrated in Fig. 5, shows another manner in which a spring clip may be formed. In this modification, the clip is formed similarly to the clip illustrated in Fig. 4 except that the locking and centering lugs are omitted. Accordingly, corresponding parts of the modified structure are designated by corresponding primed numerals and the structure is therefore clear without further details of description.

This form of spring clip is designed particularly for use under circumstances in which some sacrifice in retaining action must be made because of later necessity of quick and easy removal by tilting or movement of the device outwardly of the supporting member. The spring clip retaining device illustrated in Fig. 5 is applied in the same manner as the clip illustrated in Fig. 4 and is first inserted into the openings of the supporting member and the resilient strips are also applied or attached in the same manner as heretofore described.

It will be seen from the foregoing description that I have provided a simple, efficient, spring clip retaining device formed of a single piece of spring metal and which may be cheaply manufactured by quantity production tools and methods. The device simplifies the application of weather stripping and resilient strips to a supporting member by the rapid assembly made possible by the design of the clip.

It is understood that various modifications and alterations may be made in my spring clip retaining device without departing from the spirit and scope of the present invention.

Having thus described my invention, I claim:

1. A spring clip retaining device for securing an element to an apertured support, comprising a strip of resilient metal having a portion in the form of divergent integral leg portions adapted to be received through an associated aperture in said support from the outer face of the support by flexing said leg portions relatively together and adapted to return toward their original condition after being passed through said aperture, locking shoulders on said divergent leg portions arranged for engagement with the inner surface of the said support when the leg portions are passed through said aperture and reflex toward their normal condition, and said device having a base portion spaced from said shoulders and extending from one end of the first portion into a position for overlying the aperture when the device is installed, lugs on said device and positioned thereon for extending into the aperture when the device is installed and said lugs having sharp edges for engagement with the peripheral wall of the aperture, and means on the said device adapted to be attached to an element to be secured to the support by the device.

2. A spring clip retaining device for securing an element to an apertured support, comprising a strip of resilient metal having a portion in the form of divergent integral leg portions adapted to be received through an associated aperture in said support from the outer face of the support by flexing said leg portions relatively together and adapted to return toward their original condition after being passed through said aperture, locking shoulders on said divergent leg portions and arranged for engagement with the inner surface of the said support when the leg portions are passed through said aperture and reflex toward their normal condition, and said device having a base portion spaced from said shoulders and extending from one end of the first portion into a position for overlying relation to the aperture when the clip is installed, lugs on said base portion extending from the plane thereof in the same general direction as the leg portions and arranged for resilient stressed engagement with the peripheral wall of the aperture and arranged to extend bias to the axis of the aperture when the clip is installed in the aperture bias to the axis of the aperture and in resilient stressed engagement with the peripheral wall thereof under outward radial pressure, and means on the said device adapted to be attached to an element to be secured to the support by the device.

3. A spring clip retaining device for securing an element to an apertured support, comprising a strip of resilient metal having a portion in the form of divergent integral leg portions adapted to be received through an associated aperture in said support from the outer face of the support by flexing said leg portions relatively together and to return toward their original condition after being passed through said aperture, locking shoulders on said divergent leg portions for engagement with the inner surface of the said support when the leg portions are passed through said aperture and reflex toward their normal condition, and said device having a base portion spaced from said shoulders and extending from the first portion into a position for overlying relation to the aperture when the clip is installed, lugs on said base portion extending from the plane thereof in the same general direction as the leg portions and arranged to become chordal relative to the circumferential wall of the aperture and in abutting relation to said wall at their edges when the clip is installed, and means on the said device adapted to be attached to an element to be secured to the support by the device.

4. A spring clip retaining device for securing an element to an apertured support, said device comprising resilient leg portions arranged for reception end foremost through an aperture of the support from the outer face of the support and having locking shoulders for engagement with the inner face of the support, said clip having a base portion operatively connected to the leg portions, resilient locking means carried by the base portion and extending therefrom in the same general direction as the leg portions and being spaced from the leg portions and arranged to enter and to resiliently engage the wall of the aperture of the support with which the leg portions of the clip are to be associated for thereby augmenting the retaining action of said resilient leg portions in securing the device to the support, and means for connecting the element to be supported to the base portion.

5. A spring clip retaining device formed of a single strip of resilient metal for securing an element to an apertured support, said device comprising resilient leg portions arranged for reception end foremost through an aperture of the support from the outer face of the support and having locking shoulders thereon for engagement with the inner face of the support, said clip having a base portion operatively connected to the leg portions, locking lugs integral with the base portion and extending therefrom in the same general direction as the leg portions and spaced from the leg portions and arranged for resilient stressed engagement with the wall of the aperture with which the leg portions of the clip are to be associated when the clip is installed, and the width of said locking lugs being disposed at substantially right angles to the width of the leg portions, and means connecting the element to be supported to the base portion.

6. A spring clip retaining device for securing an element to an apertured support and comprising a base, a portion between the lateral edges of the base being free at one end from the base entirely to one end of the base and having one end joining the base at a position in spaced relation to said one end of the base and said last portion extending from its said joined end away from the plane of the base partway of its length and back toward the base for the remainder of its length and in the form of a loop and having its free end in substantially abutting relation to that face of the base which is exposed toward the loop and at a position relative to the length of the base more removed from said one end of the base than said joined end of the last mentioned portion.

7. A spring clip retaining device formed of a single strip of resilient metal for securing an element to an apertured support and comprising a base portion, integral leg portions in the shape of a diamond-shaped shank portion arranged for reception end foremost through an aperture of the support, the width of said shank portion being less than the width of said base portion and the shank being located centrally of the width of the said base portion, one of said leg portions joining said base portion at a position in spaced relation to one end of the base portion, said leg portions being divergent from the base portion partway of their length and convergent toward the base portion the remainder of their length and in the form of a loop having its free end in substantially abutting and in underlying relation to that face of the base which is exposed toward the shank portion and at a position relative to the length of the base more removed from said one end of the base than said joined end of the leg portion, resilient locking lugs on the base portion and extending therefrom in the same direction as the leg portions and being spaced from the leg portions and arranged to resiliently engage the peripheral wall of the aperture of the support with which the leg portions of the clip are to be associated for augmenting the retaining action of said resilient leg portions in securing the device to the support, and means for connecting the element to be supported to the base portion.

JOHN H. VAN UUM.